Patented Nov. 6, 1934

1,979,351

UNITED STATES PATENT OFFICE 1,979,351

3,6 DIAMINO 2-ALKYL PYRIDINE AND PROCESS FOR PRODUCING THE SAME

Herman J. Schneiderwirth, New York, N. Y.

No Drawing. Application April 25, 1932, Serial No. 607,508

8 Claims. (Cl. 260—42)

My invention relates to diamino pyridines and their process of production and refers particularly to 3,6 diamino 2-alkyl pyridines and processes for their production.

I have found that these previously unknown derivatives of pyridine can be produced by the action of sodamide upon 2-alkyl pyridine according to the processes herein described.

Without limiting myself to any particular form of apparatus, I prefer to use a covered steel container, having a stirrer therein, a pipe extending into the lower portion of the container for the introduction of ammonia gas, a pipe extending from within the upper portion of the container and connected with a reflux condenser, means for the introduction of a liquid dispersing chemical and means for the introduction of a pyridine compound. This apparatus is similar to those usually employed for similar operation.

I give the following as examples of the following of my process for the production of the new pyridine compounds specified:—

EXAMPLE 1

3,6 Diamino 2-methyl pyridine 500 grams of metallic sodium are placed in the container and the cover placed in closed position. The container is heated until the sodium is melted, the heat raised and the sodium is converted into sodamide by the introduction of ammonia gas into the melted mass. The optimum temperature should be about 400° C. The developed gases, hydrogen and excess ammonia escape to the reflux condenser and the uncondensed gases allowed to escape. The contents of the container now consists of about 850 grams sodamide, and at a temperature slightly above its melting point, which is 206° C., a liquid disperser which is chemically indifferent to the sodamide and the products formed by future steps of procedure is introduced and which has a high flash point and a high boiling point, which in this example consists of 1000 grams paraffin, and the mass is stirred. The temperature is then reduced to about 125° C. and 600 grams 2-methyl pyridine (2 picoline) are slowly added. The reaction commences immediately and hydrogen escapes through the reflux condenser. The temperature is now raised to 130° C. and further to 160° C. during a period of from 8 to 12 hours. During this step of my process the hydrogen in position 6 is replaced by an amino group. I then raise the temperature gradually to a point between 200° C. and 300° C. for a period of from 6 to 10 hours during which the reaction is quite violent, and hydrogen escapes. During this second step of my process the hydrogen in position 3 is replaced by an amino group, forming 3,6 diamino 2-methyl pyridine, have the formula

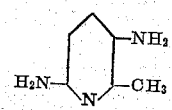

The thick mass is cooled to about 100° C. and water is added in an amount equal to three or four times the amount of original sodamide. It is then transferred while still hot to a separate receptacle and allowed to cool. There are thus formed three layers, the upper layer containing the paraffin, the middle layer containing the 3,6 diamino 2-picoline and the lower layer containing sodium hydroxide and sodium carbonate. The middle layer is removed and dissolved in boiling toluene, or benzene, to a solution of high concentration and filtered through charcoal. The 3,6 diamino 2-picoline crystallizes from the solution upon cooling and can also be obtained in pure form by vacuum distillation. The yield depends largely upon the temperatures employed, it being especially advisable to maintain a sufficiently high temperature to convert the mono-amino-picoline into the diamino picoline.

The 3,6 diamino 2-picoline thus produced forms light silvery, shining, slightly transparent, flakes almost white in color but assuming a yellow tint when exposed to the air for some time. It is very soluble in water, the solution being slightly alkaline. It is also soluble in alcohol, acetone, benzene, toluene, ether, chloroform, fatty oils and glycerine. It is insoluble in carbon tetrachloride and mineral oils. It has a melting point of 65° C. to 66° C.

A further means of identification consists in the formation of phenyl-azo-3,6 diamino 2-picoline. This is formed by adding diazotized aniline to a solution of the 3,6 diamino 2-picoline hydrochloride, almost neutralizing with sodium acetate and separating the hydrochloride of the product, which has a melting point of 175° C. It is a dark red powder, soluble in water, the addition of an alkali precipitating an orange colored base, having a melting point of 118° C. The base is insoluble in water and very soluble in lipoids. The dye thus produced has strong anti-bacterial properties, is non-toxic and non-irritant. It probably has the formula

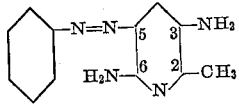

I have further found that a new compound having probably the formula

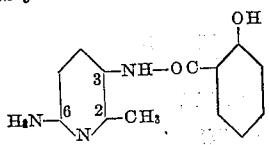

can be produced by boiling equal molecular proportions of ortho-hydroxy-benzoic acid with the 3,6 diamino 2-picoline for several hours with a reflux condenser. This new compound forms fine, soft, silk-like needles having a melting point of 134° C.

EXAMPLE 2

3,6 diamino 2-ethyl pyridine

The same container is employed as in Example 1. 100 grams sodamide are mixed with ethyl-naphthalene and heated to 130° C. 50 grams of 2-ethyl pyridine (2-lutidine) are slowly added with constant stirring and the temperature gradually raised to 180° C. over a period of from 5 to 8 hours. The temperature is then raised to 250° C. at which temperature a strong reaction takes place. This temperature is retained for about 4 hours. The mixture is cooled and about 400 c. c. water are gradually added. The crude reaction product is removed and purified as described in Example 1. The product forms slightly yellow somewhat transparent crystals, soluble in water to a lesser degree than 3,6 diamino 2-picoline. It is soluble in benzene and toluene to about 2%. Soluble in acetone, alcohol and ether, slightly soluble in chloroform and carbon tetrachloride. The aqueous solution has an alkaline reaction. The addition of a few drops of formaldehyde solution to the aqueous solution forms a white, voluminous precipitate. The product has a bitter taste and possesses anæsthetic properties. It has probably the formula

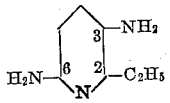

Among the pyridine compounds suitable for the production of new compounds by my process are the 2-alkyl pyridines in which the 3 and 6 positions are open for amino groups, such as 2-picolines, 2-collidines, 2-lutidines and 2-parvolines.

Among the liquid dispersing agents indifferent to sodamide and the products of my process are liquid paraffin, methyl and ethyl naphthalenes, para cymol, and diethyl aniline, and such other dispersing agents as are liquid at the temperatures of my process. Dyes and condensation products can be obtained from the other products of my process as explained under Example 1.

In my examples I have explained the production of sodamide in the same container in which the other steps of my process are conducted, but it is evident that the sodamide may be produced elsewhere and then added to my process at the step indicated.

I do not limit myself to the particular chemicals, quantities, times, temperatures or steps of procedure specifically mentioned, as these are given simply as a means for clearly describing my process and the results produced thereby.

What I claim is:—

1. In a process for the production of 3,6 diamino 2-alkyl pyridine, the steps which consist in heating a mixture of 2 alkyl pyridine with sodamide and an inert liquid dispersing agent to not less than 200° C., adding water and isolating the thus produced 3,6 diamino 2-alkyl pyridine.

2. In a process for the production of 3,6 diamino 2-alkyl pyridine, the steps which consist in heating a mixture of one molecule of 2 alkyl pyridine with two molecules of sodamide and an inert liquid dispersing agent to a temperature not less than approximately 200° C., adding water and isolating the thus produced 3,6 diamino 2-alkyl pyridine.

3. In a process for the production of 3,6 diamino 2-picoline, the steps which consist in heating 6 amino 2-picoline with sodamide and an inert liquid dispersing agent, adding water and isolating the thus produced 3,6 diamino 2-picoline.

4. In a process for the production of 3,6 diamino 2-picoline, the steps which consist in heating 6 amino 2-picoline with sodamide and an inert liquid dispersing agent to a temperature not less than approximately 200° C., adding water and isolating the thus produced 3,6 diamino 2-picoline.

5. In a process for the production of 3,6 diamino 2-alkyl pyridine, the steps which consist in heating a mixture of not less than two molecular parts of sodamide with one molecular part of 2 alkyl pyridine and an inert liquid dispersing agent, heating the mixture gradually to approximately 125° C., raising the temperature to approximately 160° C., maintaining this temperature for about 12 hours raising the temperature to not less than 200° C., retaining this temperature for approximately 10 hours, adding water and separating the thus produced 3,6 diamino 2 alkyl-pyridine.

6. In a process for the production of 3,6 diamino 2-picoline, the steps which consist in heating a mixture of not less than two molecular parts of sodamide with one molecular part of 2-picoline and an inert liquid dispersing agent, heating the mixture gradually to approximately 125° C., raising the temperature to approximately 160° C. maintaining this temperature for about 12 hours, raising the temperature to not less than 200° C., retaining this temperature for approximately 10 hours, adding water and separating the thus produced 3,6 diamino 2-picoline.

7. 3,6 diamino 2-alkyl pyridine.
8. 3,6 diamino 2-picoline.

HERMAN J. SCHNEIDERWIRTH.